United States Patent

[11] 3,610,704

[72] Inventors Charles F. B. Shattock;
Oswald G. Shanks; Sydney A. Stevens;
Boguslaw W. Wojteeki, London, England;
Robert J. Dixon, Palos Verdes Peninsula, Calif.
[21] Appl. No. 871,022
[22] Filed Sept. 25, 1969
[45] Patented Oct. 5, 1971
[73] Assignee Westinghouse Brake and Signal Company Ltd.
London, England
[32] Priority Dec. 21, 1965, Apr. 29, 1966, May 18, 1966, May 27, 1966, July 8, 1966, July 15, 1966, July 20, 1966
[33] Great Britain
[31] 54,066 1965, 18817 1966, 22018 1966, 23,776 1966, 30,718 1966, 31,868 1966 and 32,617 1966

[54] FLUID PRESSURE CONTROL VALVES AND BRAKING APPARATUS
29 Claims, 3 Drawing Figs.
[52] U.S. Cl..................................................... 303/22, 303/20
[51] Int. Cl..................................................... B60t 8/22
[50] Field of Search............................................ 303/20, 22

[56] References Cited
UNITED STATES PATENTS
3,148,919 9/1964 Simmons et al............... 303/22 X
3,304,129 2/1967 Wilson ........................ 303/22 X Primary Examiner—Duane A. Reger
Attorney—Larson, Taylor & Hinds ABSTRACT: A fluid pressure control valve having a restricted flow inlet, an outlet and an exhaust port provided with a valve seat. A throttling element is movable towards and away from the valve seat to vary the throttling effect and thereby vary the pressure at the outlet port in proportion to the amount of throttling. A cantilever-mounted leaf-spring has its free end operatively engaging the throttle element. Loading means, operable in response to a predetermined signal, controls movement of the free end of the leaf-spring and hence movement of the throttling element. The exhaust port is carried by a member which is movable towards and away from the throttling element to effect adjustment to the minimum throttling effected by the throttling element.

FLUID PRESSURE CONTROL VALVES AND BRAKING APPARATUS

This application is a division of our previous copending application Ser. No. 600,799, filed Dec. 12, 1966 now U.S. Pat. No. 3,503,656 issued Mar. 31, 1970.

This invention relates to fluid-pressure control valves.

The present invention provides a fluid-pressure control valve having a restricted fluid flow inlet port, an outlet port, an exhaust port providing a valve seat, a throttling element movable towards and away from the valve seat thereby to effect a varying degree of throttling to the passage of fluid through the valve seat, a cantilever-mounted leaf-spring the free end of which is operatively engageable by the throttling element, and loading means by which the free-end of the leaf-spring can be loaded such that, in operation of the valve, when a fluid pressure of predetermined value pertains at the inlet port, the value of the fluid-pressure pertaining at the outlet port is dependent upon the rate of escape of fluid through the valve seat which rate is in turn determined by the degree of throttling effected by the throttling element consequent upon the degree of loading of the leaf-spring by said means.

The exhaust port may be carried by a member which is movable towards and away from the free end of the leaf-spring to effect adjustment of the minimum throttling effected by the throttling element. The member may have therein a first conduit one end of which provides the valve seat, and transverse second conduits each communicating with the first conduit, one of the second conduits being in communication with the inlet port and the other of the second conduits being in communication with the outlet port, the member being axially movable within a bore in a body of the valve to effect said adjustment and the member being sealed with respect to the bore such as to prevent intercommunication of the three ports except by way of the first conduit. The arrangement may be such that the throttling element is urged by its weight in a direction tending to seat the element on the valve seat. The throttling element may conveniently be constituted by a ball. In this case, the leaf-spring may be provided adjacent its free-end with a cup-shaped button which serves loosely to locate the element in position.

The loading means may be electromagnetically operable. In this case, the loading means may include a permanent magnet and a cooperating armature coil. The permanent magnet may be fixedly located and the electromagnet may be carried by the leaf-spring adjacent the free end thereof. In this arrangement, the electromagnet may be annular and may then be mounted coaxially with respect to the button when provided.

The inlet port may include a choke.

The inlet port may be arranged to be supplied with fluid under pressure via a pressure-limiting valve.

The outlet port may be connected to a relay valve the operation of which is controlled by the pressure pertaining at the outlet port. If the fluid-pressure control valve is used in a context in which for most of the time the value of the fluid-pressure pertaining at the outlet port is required to be substantially at atmospheric pressure, this will be achieved by having a minimum throttling effect at the valve seat such that there is thereby a continuous loss of fluid through the valve seat of so long as the fluid-pressure at the outlet port is substantially at atmospheric pressure. Such loss of fluid through the valve seat may be objectionable and in order to overcome this there may be provided in the fluid path to the inlet port, a further valve by which supply of fluid through the inlet port can be prevented.

The operation of the further valve may be so connected with the movement of the throttling element, that immediately upon movement of the throttling element towards the valve seat the further valve is operated to allow fluid pressure to pertain at the inlet port.

Where the means of the fluid-pressure control valve is electromagnetically operable, said further valve may also be electromagnetically operable. In this case, upon operation of the loading means the further valve may also be immediately operated to allow pressure to pertain at the inlet port.

There may also be provided a cutoff means by which the supply of fluid to the valve seat is prevented in the event of the pressure of the fluid which would otherwise be supplied to the valve seat being below a predetermined value.

Where as above-described, the exhaust port is carried by a member movable towards and away from the free end of the leaf-spring to effect adjustment of the minimum throttling by the throttling element, the cutoff means may conveniently be embodied in the member. In such a case, the member may have therein a passage leading to the valve seat, passage closure means by which the passage may be sealed, and pressure-sensitive means operatively connected to the passage-closure means and subjectable to the pressure of the fluid supplied to the valve seat, the pressure-sensitive member being resiliently loaded in a direction to effect closure of the passage by the passage-closure means.

There may be provided supplementary loading means by which, independently of the first mentioned loading means, the free-end of the leaf-spring can be loaded in a similar manner to achieve a similar result in loading thereof by the first mentioned means achieved. The supplementary loading means may be resiliently biased to effect resilient loading of the leaf-spring and the supplementary loading means includes overrising means by which the resilient bias is overcome normally to prevent the bias being effective. The overriding means may be variably operative so as, at will, to be operative to a varying degree to counteract the resilient bias, and may comprise an electromagnetic device which is energized to overcome the resilient bias.

Embodiments of the present invention will now be described in greater detail, by way of example only with reference to the accompanying drawings, of which:

Figure 1:
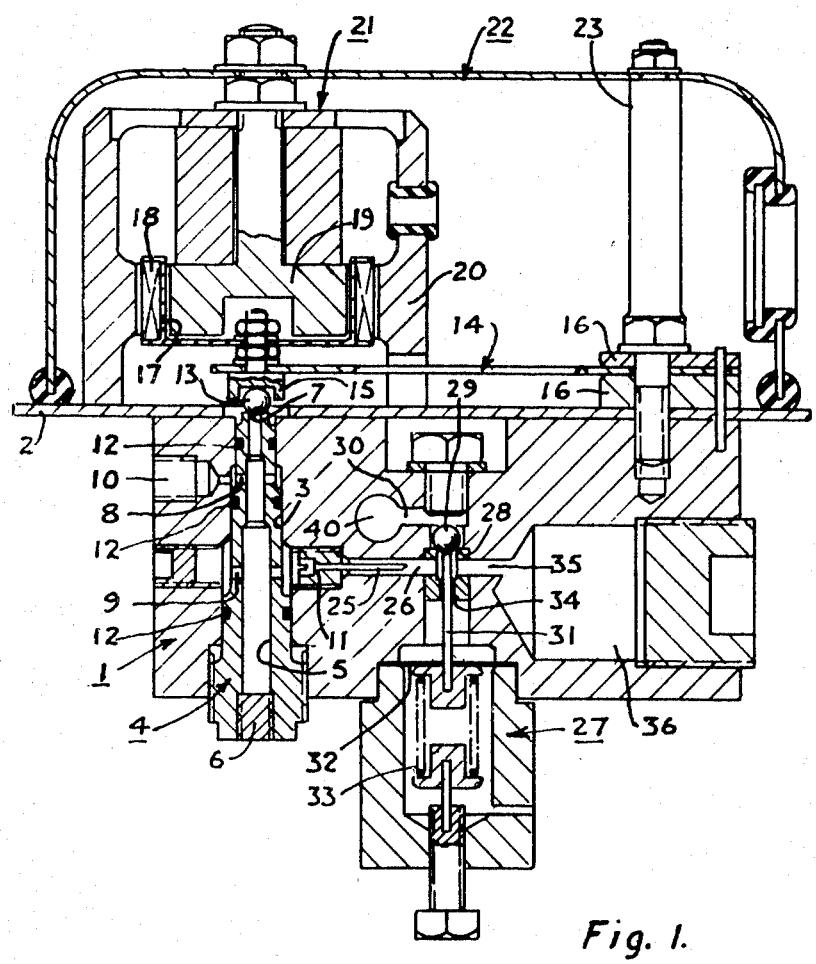
FIG. 1 shows a cross-sectional view of a fluid pressure control valve.

The valve body 1 is provided with a stepped bore 3 within which is axially adjustable a member 4 having therein an axially extending first conduit 5 sealed at its lower end 6 and providing at its upper end an exhaust port 7 constituting a valve seat. Extending transversely of the conduit 5 are two second conduits 8 and 9 respectively. The conduit 8 communicates with an outlet port 10 and the conduit 9 communicates with an inlet port 11. The member 4 is sealed with respect to the bore 3 by sealing means 12 effective to prevent intercommunication of the parts 7, 10 and 11 except by way of the first conduit 5.

Seated by its own weight on the exhaust port 7 is a throttling element 13 in the form of a ball.

The ball 13 is engageable with the free end of a cantilever-mounted leaf-spring 14, through an inversely mounted cup-shaped button 15 which serves loosely to locate the element 13 and which is carried adjacent the free end of the leaf-spring 14 which is clamped at its other end between mounting blocks 16 secured to the mounting plate 2.

Coaxially mounted with respect to the button 15 and carried by the leaf-spring 14 adjacent its free end thereof, is a lightweight former 17 encircled by an annular armature coil 18 lying between the inner pole 19 and the encircling outer pole 20 of a permanent magnet 21 fixedly located on an enclosing housing 22 secured to the mounting plate 2 by pillars (of which one only is shown) 23.

The inlet port 11 communicates through a choke 25 with an outlet port 26 of a pressure limiting valve 27. The pressure limiting valve 27 comprises a valve seat 28 into and out of engagement with which is movable a ball-shaped valve closure element 29 lying between the outlet port 26 and an inlet port 30. The valve closure element 29 is arranged for operation by a push rod 31 carried by a diaphragm 32 the underside of which is resiliently loaded by a spring 33 and to the top side of which is applied (through a passage 34 encircling the push rod 31) the pressure pertaining at the outlet port 26. The outlet port 26 is also connected through a conduit 35, with a volume 36. The inlet port 30 is connected through a passage 40, to a source of supply of fluid under pressure. The above-described control valve operates as follows:

With the passage 40 connected to a source of fluid under pressure, fluid pressure will build up in the chamber 36 and at the outlet port 26 of the limiting valve 27 until this pressure reaches the limit determined by the setting of the valve 27. At this limit, the downward force on the diaphragm 32 exerted by the pressure of the fluid above the diaphragm 32, will balance the force exerted upwardly on the diaphragm 32 by the spring 33. It will be seen, therefore, that the valve 27 will be effective to control the degree of fluid pressure at the outlet 26 within fine limits.

From the outlet port 26 of the valve 27, fluid under pressure can flow through the choke 25 of the inlet port 11 through the second conduit 9 into the first conduit 5. From the first conduit 5, the fluid under pressure has two paths open to it. It can flow from the first conduit 5 through the second conduit 8 to the outlet port 10 and it can flow from the first conduit 5 through the exhaust port 7 past the throttling element 13. How much of the fluid in the conduit 5 will flow through the exhaust port 7 will depend upon to what degree the passage through the exhaust port 7 is throttled by the throttling element 13. Moreover, the pressure of the fluid at the outlet port 10 will depend upon at what rate fluid is exhausted through the exhaust port 7.

The rate at which fluid is exhausted through the exhaust port 7 will be dependent upon the balancing of the forces acting on the element 13.

Considering, firstly, the case when the coil 18 is deenergized, the forces acting downwardly on the element 13 will be, firstly, the weight of the element 13 and, secondly, the weight of the coil 18, the former 17, the button 15, and a part of the weight of the leaf-spring 14. However, from this second force must be subtracted the restoring effort of the leaf-spring 14 tending to counteract the downward deflection of the leaf-spring 14 at its free end due to the weight of the coil 18, the former 17, the button 15 and that part of the weight of the leaf-spring 14. Acting upwardly in opposition to this summation of forces will be the force exerted on the element 13 by the pressure of the fluid passing through the port 7.

With the coil 18 deenergized, the member 4 can be set at an axial position in the bore 3 to provide an escape of fluid through the port 7 which is of such a rate that the pressure of fluid at the outlet port 10 is at the required minimum.

If, however, the coil 18 is now energized a further additional force (proportional to the degree of energization of the coil 18) will be exerted downwardly on the element 13 due to the reaction between the electromagnetic effect resultant upon the energization of the coil 18, and the effect of the permanent magnet 21. This additional downward force will tend to move the element 13 downwardly further to throttle the port 7. This increase in throttling of the port 7 will, on the one hand, reduce the rate at which fluid is exhausted through the port 7 and, on the other hand, increase the pressure of this exhausting fluid. Increased throttling of the port 7 will continue until once again, there is a balance of forces on the element 13 and this increased throttling of the port 7 will increase the pressure at the outlet port 10.

By suitable choice of proportions between the stiffness of the leaf-spring 14, the diameter of the ball-element 13 and the diameter of the exhaust port 7, it is possible to obtain (within very close limits) a linear relationship between the current in the coil 18 and the pressure at the outlet port 10.

Theoretically, however much the clearance between the element 13 and the port 7 is increased, the pressure in the outlet port 10 can never be zero. To avoid the necessity of having a large clearance (and consequent possible deviation from linearity of the pressure at the outlet port 10 with respect to the current flowing in the coil 18) it is desirable that the minimum pressure at the outlet port 10 should be about 3 lbs. per sq. inch. As has been explained, this minimum pressure is determined by the axial setting of the member 4 in the bore 3.

Although, as has been stated above, it is theoretically possible to obtain a practically linear relationship between the current flowing in the coil 18 and the pressure at the outlet port 10, production variations between different valves may result in slightly differing characteristics between the valves. These differing characteristics may arise from any one or more of the following:

a. the coil winding 18 may not be identical from one valve to another.
b. the magnetic flux between the poles of the permanent magnet 21 may not be the same between valves.
c. the diameter of the port 7 may vary within manufacturing tolerances.
d. temperature variations within the coil 18 due either to the fact of current passing through the coil 18 or a change in ambient temperature conditions.

Nonlinearity arising from (a), (b) and (c) can be corrected by the addition of a trimmer resistance across the coil 18 and nonlinearity (due to (d)) above can be corrected by embodying a thermistor in the coil winding 18.

It will be appreciated that the volume output from the outlet 10 is, of course, very small but if the outlet port 10 is connected to the control chamber of a relay valve, a large output can be obtained from the relay valve. Conveniently, the relay valve can be made integral with the above-described control valve.

The means by which the free end of the leaf-spring 14 can be loaded to a varying degree in the above-described embodiment, has been shown as electromagnetically operated but alternative resilient forms of operating these means could be provided. For example, the loading on the leaf-spring 14 could be provided by a hand or foot lever compressing a spring one end of which was engaged by the lever and the other end of which bore against the leaf-spring 14.

In the above-described embodiment, an increase of pressure at the outlet port 10 is consequent upon an increase in current in the coil 18. However, conversely, the arrangement may be such that an increase in pressure at the outlet port 10 is consequent upon a fall in current in the coil 18.

The control valve specifically described and illustrated in FIG. 1 is so arranged that the coil 18 is normally deenergized and that there is normally through the seat 7, a maximum escape of fluid due to the minimum throttling effect of the throttling element 13, so as to result in a minimum pressure at the outlet port 10; energization of the coil 18 increasing the throttling effect of the throttling element 13 to increase the pressure at the outlet port 10. Hence,, in the "normal" condition of the valve there is a "maximum" loss of fluid through the seat 7.

To obviate this disadvantage there may be provided in the passage 40 a further valve by which the presence of fluid-pressure at the inlet port 11 from a reservoir, is prevented or permitted in accordance with the operation of the further valve.

The further valve may also be electromagnetically operated and may, in its "energized" condition, be arranged to prevent the supply of fluid-pressure from a reservoir to the inlet port 11, energization of the further valve causing the valve to open to permit fluid-pressure to pertain at the inlet port 11. In this case, the control circuits of said further valve and the coil 18 may be so interlocked that operation of a common operating member to commence energization of the coil 18 immediately causes energization of said further valve so that it is thereby operated to permit fluid-pressure to pertain at the inlet port 11 ready for control by the throttling effect of the throttling member 13 in dependence upon the degree of energization of the coil 18.

However, if the control valve is so arranged that minimum pressure at the outlet port 10 achieved by minimum throttling of the throttling element 13 arises from the maximum energization of the coil 18, the control circuit of the electromagnetic further valve may be so interconnected with the control circuit of the coil 18 that when the coil 18 was energized to the maximum extent, the further valve is also operated to close the communication between a reservoir and the inlet port 11 such as thereby to prevent any pressure obtaining at the inlet port 11. In this case, of course, commencement to deenergize the coil 18 would immediately cause reverse operation of said further valve such that it was thereby opened to permit pressure to obtain at the inlet port 11.

Figure 2:
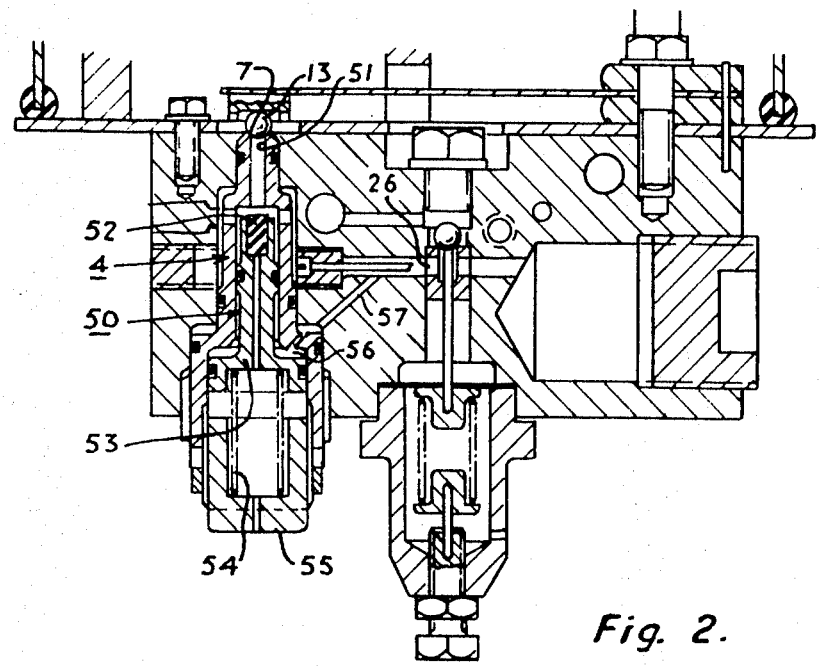
FIG. 2 shows a cross-sectional view of the relevant parts of a modification of the valve shown in FIG. 1.

Referring to FIG. 2 of the drawings, in which like references are used for like parts of the valve described with reference to and illustrated in FIG. 1 of the drawings cutoff means 50 is shown embodied in the member 4 of the valve. The member 4 has at its upper end (as viewed in the drawing) a passage 51 which communicates at its upper end with the exhaust port 7 against which is seatable the ball 13. At its lower end, the passage 51 is closable by a passage-closure member 52 of resilient material carried by a piston 53 slidable within the member 4. The piston 53 is resiliently loaded by a spring 54 which urges the piston 53 upwardly to urge the passage-closure member 52 in a direction to close the passage 51. As can be seen, the spring 54 extends between the piston 53 and a cap 55 which is screwed into the bottom of the member 4 so that by screwing the cap 55 inwardly and outwardly of the member 4, the degree of compression of the spring 54 can be adjusted to vary the loading of the piston 53.

Above the piston 53 and inside the member 4 is a chamber 56 which communicates with the inlet port 26 through a bypass conduit 57.

The operation of a valve modified as shown in FIG. 2 is identical to that of the valve of FIG. 1 so long as the pressure of the fluid supply to the passage 51 is of the desired value (which is determined by the degree of compression of the spring 54) for, in this case, the pressure of this supply (which will be applied in the chamber 56) will maintain the piston 53 and the passage-closure member 52 in the position shown in the drawing, to permit the normal operation of the valve.

However, should the pressure of the fluid supply drop below a predetermined value, then the force this pressure will exert on the piston 53 will be overcome by the force exerted by the spring 54 which will, therefore, move the piston 53 upwardly to move the passage-closure member 52 into engagement with the lower end of the passage 51 and thereby seal the passage 51 and prevent the flow of air through the valve seat 7 and thus of any further depletion of the fluid supply pressure.

Figure 3:
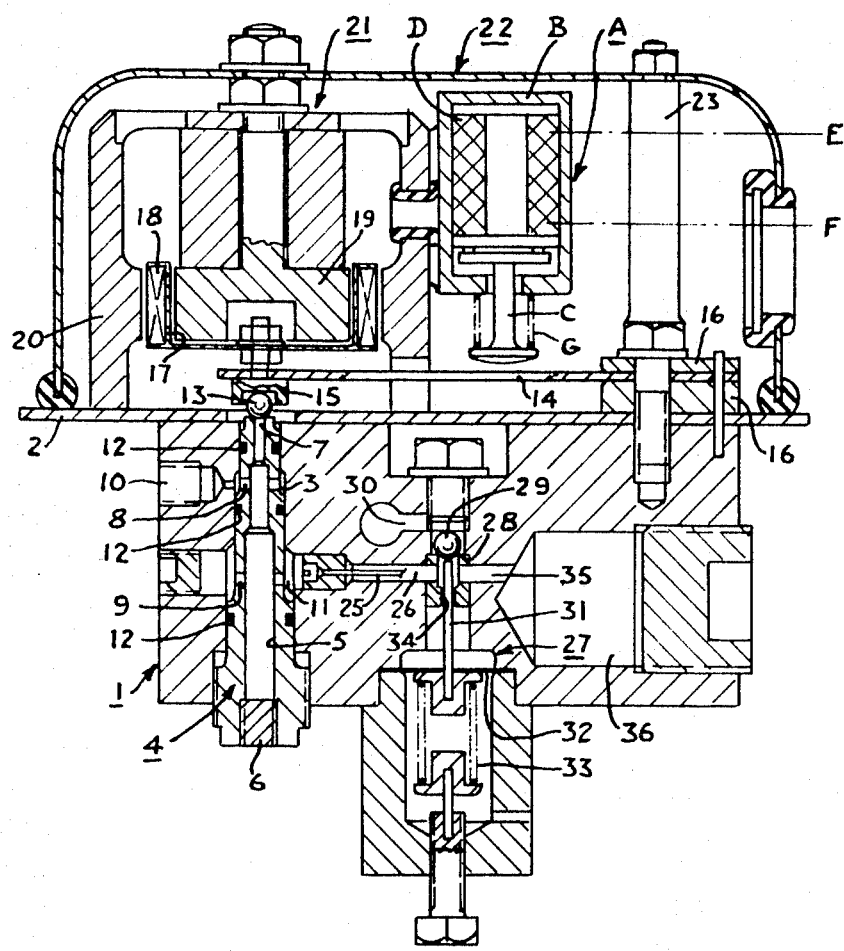
FIG. 3 shows a cross-sectional view of a further modification of the valve of FIG. 1, Referring to FIG. 1 of the drawings, the control valve comprises a valve body 1 secured to the underside of a mounting plate 2.

Turning now to FIG. 3 of the accompanying drawings, there is here illustrated a valve which is identical to that of FIG. 1 (again, like references indicating like parts) save that the valve of FIG. 3 is provided with supplementary loading means A which (as will hereinafter be described) upon a "breakaway" of a trailer from a tractor controls the braking apparatus on the trailer to secure a braking effort, irrespective of the weight of the trailer, which will result in no more than a predetermined degree of braking of the trailer. According to the particular application of the valve, this may be the maximum pressure or a pressure intermediate the minimum and maximum pressures obtainable at the outlet port by operation of the first mentioned loading means.

The means A comprises an electromagnet B having an armature C which, when current is flowing in the coil D of the electromagnet B (through wires E and F) hold the armature C against the effort of a spring C, from engagement with the leaf-spring 14. The coil D is normally energized from the tractor so that the means A is not normally effective.

However, in the event of a "breakaway" of the trailer, not only will coil 18 be deenergized but so also will be the coil D. In this event, the spring C will be effective to move the armature C into engagement with the leaf-spring 14 and thereby to exert through the armature C a resilient loading on the leaf-spring 14 which, in the same manner as the previously described resilient loading effected by the coil 18, will (by varying the throttling effect of the ball 13 on the exhaust valve seat 7) effect a predetermined fluid pressure at the outlet port 10.

By suitable choice of the value of the spring C and the position of the means A along the length of the leaf-spring 14, the value of the output pressure at the output port 10 can be chosen to be a desired value. In accordance with the present invention, the value so chosen will be such as to result in a degree of braking which is somewhat less than the maximum degree of braking normally obtainable on the trailer.

In an alternative or normally energized arrangement of the control valve, in which removal of a signal to 18 gives rise to maximum throttling,, removal of the energization of D due to a breakaway can be arranged to so load the spring 14 that maximum or less than maximum throttling is produced by ball 13 to hold the braking effort to a safe value even for an unloaded trailer.

Having thus described our invention what we claim is:

1. A fluid pressure control valve having a restricted fluid flow inlet port, an outlet port, an exhaust port providing a valve seat, a throttling element movable towards and away from the valve seat thereby to effect a varying degree of throttling to the passage of fluid through the valve seat, a cantilever-mounted leaf-spring the free end of which is operatively engageable by the throttling element and loading means by which the free end of the leaf-spring can be loaded such that in operation of the valve, when a fluid pressure of predetermined value pertains at the inlet port, the value of the fluid-pressure pertaining at the outlet port is dependent upon the rate of escape of fluid through the valve seat which rate is in turn determined by the degree of throttling effected by the throttling element consequent upon the degree of loading of the leaf-spring by said means.

2. A valve as claimed in claim 1, wherein the exhaust port is carried by a member which is movable towards and away from the free end of the leaf-spring to effect adjustment of the minimum throttling effected by the throttling element.

3. A valve as claimed in claim 2, wherein the member has therein a first conduit one end of which provides the valve seat, and transverse second conduits each communicating with the first conduit, one of the second conduits being in communication with the inlet port and the other of the second conduits being in communication with the outlet port, the member being axially movable within a bore in a body of the valve to effect said adjustment and the member being sealed with respect to the bore such as to prevent intercommunication of the three ports except by way of the first conduit.

4. A valve as claimed in claim 1, wherein the throttling element is urged by its weight in a direction tending to seat the element on the valve seat.

5. A valve as claimed in claim 1, wherein the throttling element is constituted by a ball.

6. A valve as claimed in claim 5, wherein the leaf-spring is provided adjacent its free-end with a cup-shaped button which serves loosely to locate the element in position.

7. A valve as claimed in claim 1, wherein the loading means is electromagnetically operable.

8. A valve as claimed in claim 7, wherein the loading means includes a permanent magnet and a cooperating armature coil.

9. A valve as claimed in claim 8, wherein the permanent magnet is fixedly located and the armature coil is carried by the leaf-spring adjacent the free-end thereof.

10. A valve as claimed in claim 9, wherein the leaf-spring is provided adjacent its free-end with a cup-shaped button which serves loosely to locate the element in position, and wherein the coil is annular and is mounted coaxially with respect to the button.

11. A valve as claimed in claim 1, wherein the inlet port includes a choke.

12. A valve as claimed in claim 1, wherein the inlet port is arranged to be supplied with fluid under pressure via a pressure-limiting valve.

13. A valve as claimed in claim 1, wherein the outlet port is connected to a relay valve the operation of which is controlled by the pressure pertaining at the outlet port.

14. A valve as claimed in claim 1, wherein there is provided in the fluid path to the inlet port a further valve by which supply of fluid through the inlet port can be prevented.

15. A valve as claimed in claim 14, wherein the operation of the further valve is so connected with the movement of the throttling element, that immediately upon movement of the throttling element towards the valve seat the further valve is operated to allow fluid pressure to pertain at the inlet port.

16. A valve as claimed in claim 15, wherein the loading means is electromagnetically operable and wherein the further valve is electromagnetically operable.

17. A valve as claimed in claim 16, wherein upon operation of the loading means, the further valve is operated to allow pressure to pertain at the inlet port.

18. A valve as claimed in claim 1, wherein there is provided cutoff means by which the supply of fluid to the valve seat is prevented in the event of the pressure of the fluid which would otherwise be supplied to the valve seat being below a predetermined value.

19. A valve as claimed in claim 18, wherein the exhaust port is carried by a member which is movable towards and away from the free end of the leaf-spring to effect adjustment of the minimum throttling effected by the throttling element, and wherein the cutoff means is embodied in the member.

20. A valve as claimed in claim 19, wherein the member has therein a passage leading to the valve seat, passage-closure means by which the passage may be sealed, and pressure-sensitive means operatively connected to the passage-closure means and subjectable to the pressure of the fluid supplied to the valve seat, as aforesaid, the pressure sensitive member being resiliently loaded in a direction to effect closure of the passage by the passage-closure means.

21. A valve as claimed in claim 1, wherein there is provided supplementary loading means by which the leaf-spring can be loaded independently of the first-mentioned means.

22. A valve as claimed in claim 21 wherein the supplementary loading means is resiliently biased to effect resilient loading of the leaf-spring and the supplementary loading means includes overriding means by which the resilient bias is overcome normally to prevent the bias being effective.

23. A valve as claimed in claim 22, wherein the overriding means is variably operative so as, at will, to be operative to different degrees to counteract the resilient bias.

24. A valve as claimed in claim 23, wherein the overriding means comprises an electromagnetic device which is energizable to overcome the resilient bias.

25. A fluid pressure device for converting a variable input signal of electrical, mechanical, pneumatic or other form into a proportional fluid pressure output, including: a restricted fluid flow inlet port, an outlet port, an exhaust port providing a valve seat and a throttling element movable towards and away from the valve seat by loading means in dependence on said input signal, so that, in operation of the device with a fluid pressure of predetermined value at the inlet port, the value of the fluid pressure at the outlet port is dependent upon the rate of escape of fluid through the valve seat, which rate is determined by the loading of the throttling element to move it with respect to the valve seat against the exhaust fluid pressure in response to said signal, said exhaust port being carried by a member which is movable towards and away from the throttling element to effect adjustment to the minimum throttling effected by the throttling element.

26. A valve as claimed in claim 25, wherein the member has therein a first conduit, one end of which provides the valve seat, and transverse second conduits each communicating with the first conduit, one of the second conduits being in communication with the inlet port and the other of the second conduits being in communication with the outlet port, the member being axially movable with a bore in a body of the valve to effect said adjustment and the member being sealed with respect to the bore such as to prevent intercommunication of the three ports except by way of the first conduit.

27. A valve as claimed in claim 25, wherein the throttling element is urged by its weight in a direction tending to seat the element on the valve seat.

28. A valve as claimed in claim 25, wherein the throttling element is constituted by a ball.

29. A valve as claimed in claim 28, wherein the loading means is provided with a cup-shaped button which serves loosely to locate the throttling element in position.